No. 865,564.

PATENTED SEPT. 10, 1907.

J. BROWN.
TOY.
APPLICATION FILED FEB. 15, 1906.

WITNESSES:
W. W. Ketchum
C. F. Morgan

INVENTOR
James Brown
BY
J. B. McGiver
ATTORNEY

UNITED STATES PATENT OFFICE.

JAMES BROWN, OF NEW YORK, N. Y.

TOY.

No. 865,564.      Specification of Letters Patent.      Patented Sept. 10, 1907.

Application filed February 15, 1906. Serial No. 301,139.

*To all whom it may concern:*

Be it known that I, JAMES BROWN, a citizen of the United States, residing in the borough of Manhattan, in the county of New York and State of New York, have invented new and useful Improvements in Toys, of which the following is a specification.

This invention relates to toys, which may be operated upon a suitable table or support, as is shown in the accompanying drawing, which forms a part of this specification.

Figure 1:
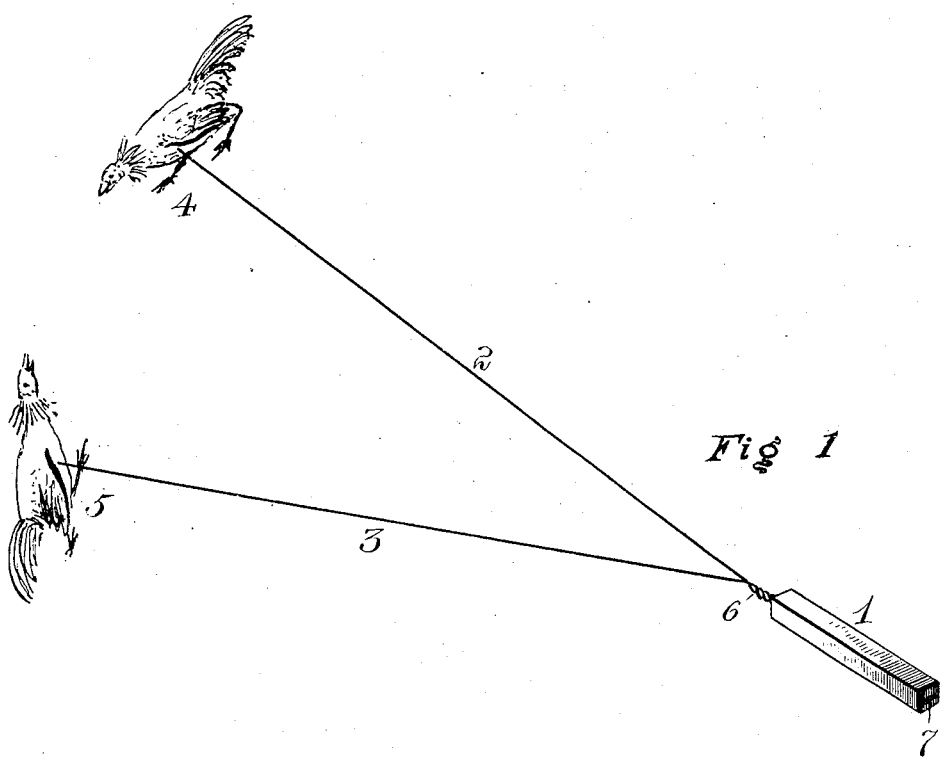
Figure 2:
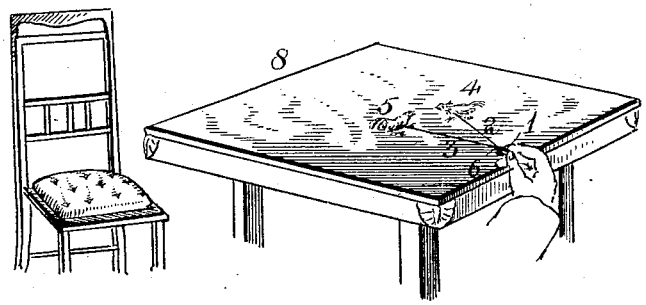

In the drawings, Figure 1 is a perspective view of the toy, representing two cocks, each of which are secured respectively to the ends of wires which extend from a spindle. Fig. 2 is a view of a table upon which the toy may be operated.

Referring to the drawings, 1 represents a small squared manipulating end or spindle, within which is suitably secured two diverging wires 2 and 3, the outer ends of which are provided, as is shown here, with two fighting cocks 4 and 5, the wires 2 and 3 are suitably fastened by being entwined as at 6, or they may be otherwise suitably secured together to keep them secured within the spindle, one of which means is shown, where the wire passes through the outer end of the spindle at 7, and is thereby held secure from being pulled out of the same.

The spindle 1, is a small piece of wood or other suitable material that may be square as shown, or it may be desirable to have the same hexagon or other suitable formations, which would be easy and quick to respond to the movements or twists of the fingers of the operator while manipulating the same. While it is desirable to have the spindle separate from the wires, yet it is to be understood that the spindle may, if necessary, be formed by arranging the wires in such a manner that it would answer the purposes.

To the end that the toy will prove realistic and of the greatest enjoyment fighting cocks have been attached to the wires, although it may be stated that a cat and dog or other objects as may be desired, can be employed with the same effect and amusement.

To have or gain the best results, it is most desirable that piano wire should be used, as it is stiff, and will hold the contesting birds apart, and yet is resilient enough to cause the birds to resume their respective places with respect to each other, as soon as the twist of the wire has been released by the operator.

Referring particularly to Fig. 2, it will be seen how it is intended that the toy should be operated. The operator places the spindle between his thumb and first finger, and by a series of quick movements or twists of the spindle between the fingers, the birds will quickly spring towards each other, at times upon each other, and by a reverse movement of the spindle, the opposite bird will assume the aggressive to the gratification of those witnessing the contest. By one skilled in operating of the spindle first to the right, then to the left, then back to the start where the birds seem to be standing and looking for advantage, the same can be made of the greatest kind of amusement.

To the end that the birds will be the most prominent, it has been found advantageous to have them of a light color, and the wires that operate them, of a dark color, so that the same will not attract attention, the said birds may be secured to the outer ends of the wires in any suitable manner.

Toys of this variety have been used before, such for instance as having two fighting birds secured to a loop of a wire, and with the aid of a string, one end secured to a stationary object while the operator manipulates the other end from a distance, and thereby cause the toy to perform on the floor, all the time the attention of everyone is riveted to the floor, and the toy in a very short time becomes monotonous. Again there are another variety of toys that have a toy attached to a wire, the latter being secured to a handle, by means of which the toy is operated, but in all these, it is necessary to have a large clear space for the manipulation of the toy, or it is necessary for to use the two hands to operate the same.

In the present instant, there is no string, no handle, and only one hand is necessary for the manipulation of the toy for the edification and enjoyment of those who may be seated about the table, and by a little practice with the toy, the fighting birds or other objects that are attached to the wires, can be made to operate to the enjoyment of grown people as well as children.

Having shown and described the preferred form of my invention, what I claim as new is:—

A toy comprising an elongated handle adapted to be whirled or revolved by the fingers of the user, and carrying at one end diverging spring wire arms, said arms having at their free end suitable figures.

In testimony whereof I have signed my name to this specification in the presence of two subscribing witnesses.

JAMES BROWN.

Witnesses:
HARRY A. WHITTAKER,
THOMAS F. BARRY.